June 3, 1947. H. W. ELKIN 2,421,689
COWLING ARRANGEMENT
Filed Oct. 9, 1944 3 Sheets-Sheet 1

INVENTOR.
HUGH W. ELKIN
BY
George C. Sullivan
AGENT

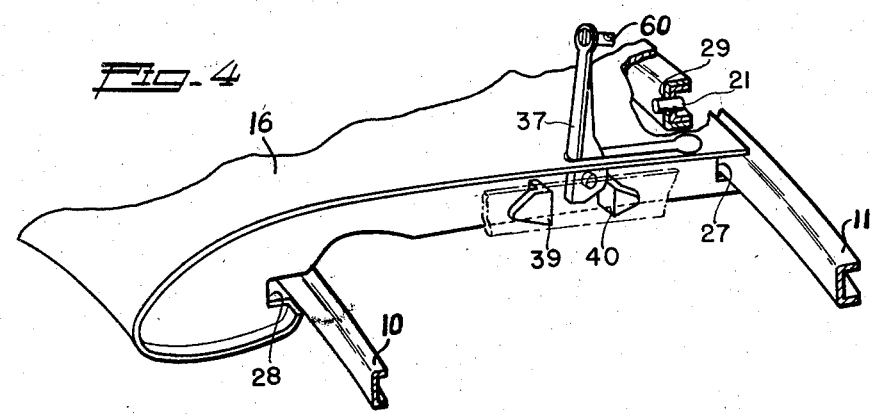
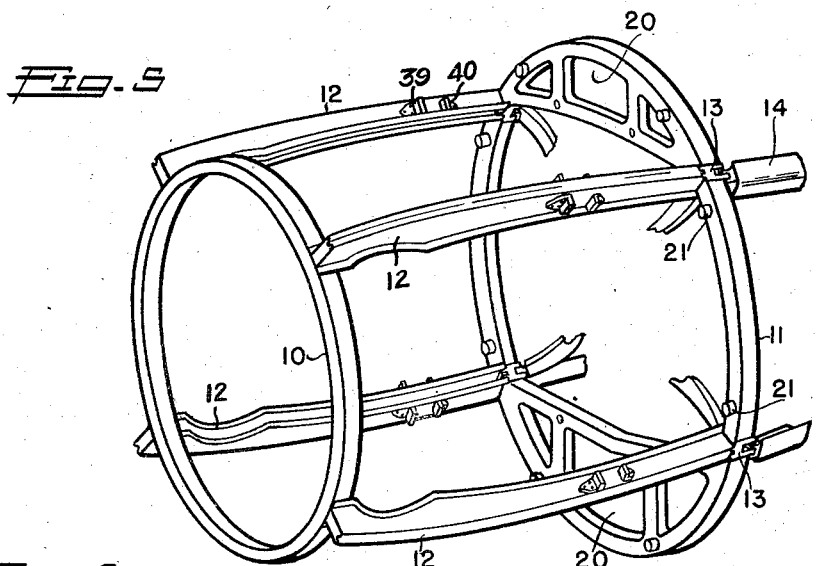
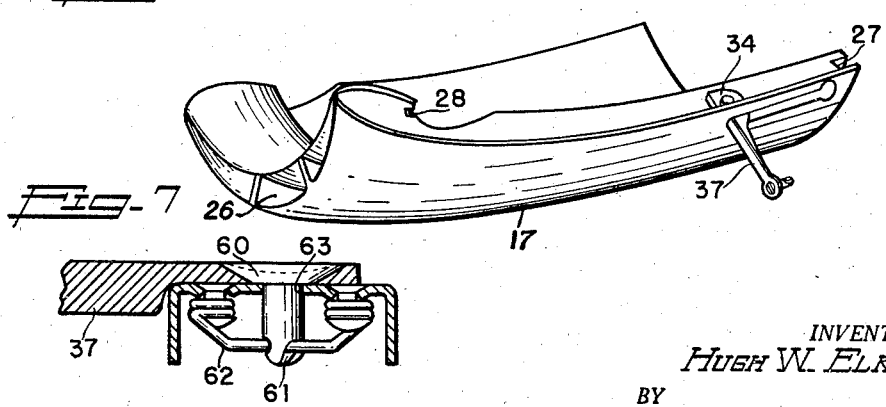

June 3, 1947. H. W. ELKIN 2,421,689
COWLING ARRANGEMENT
Filed Oct. 9, 1944 3 Sheets-Sheet 3
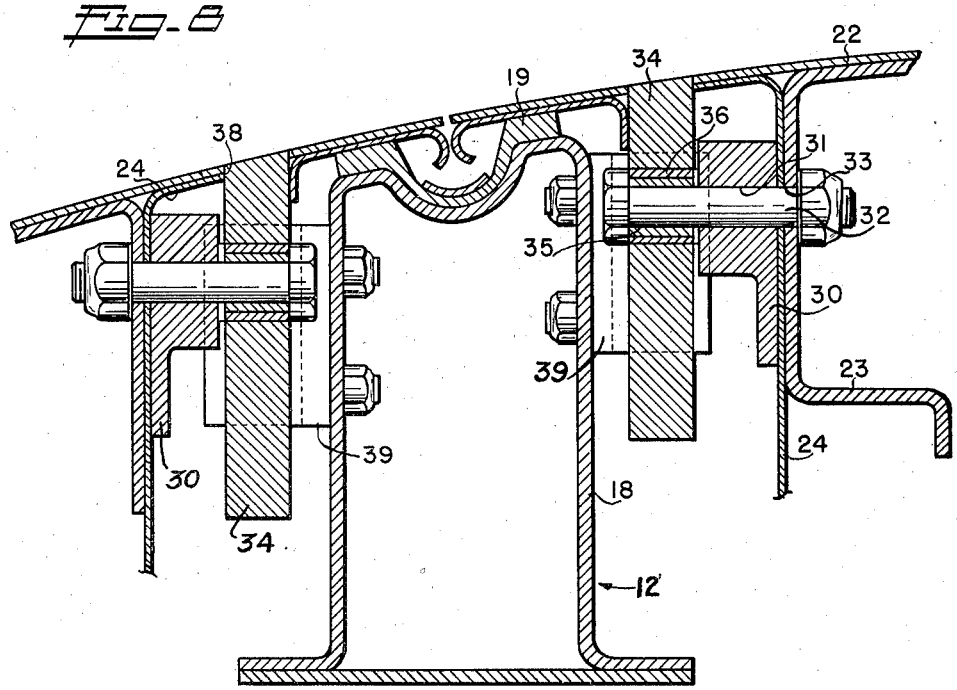
Fig. 8
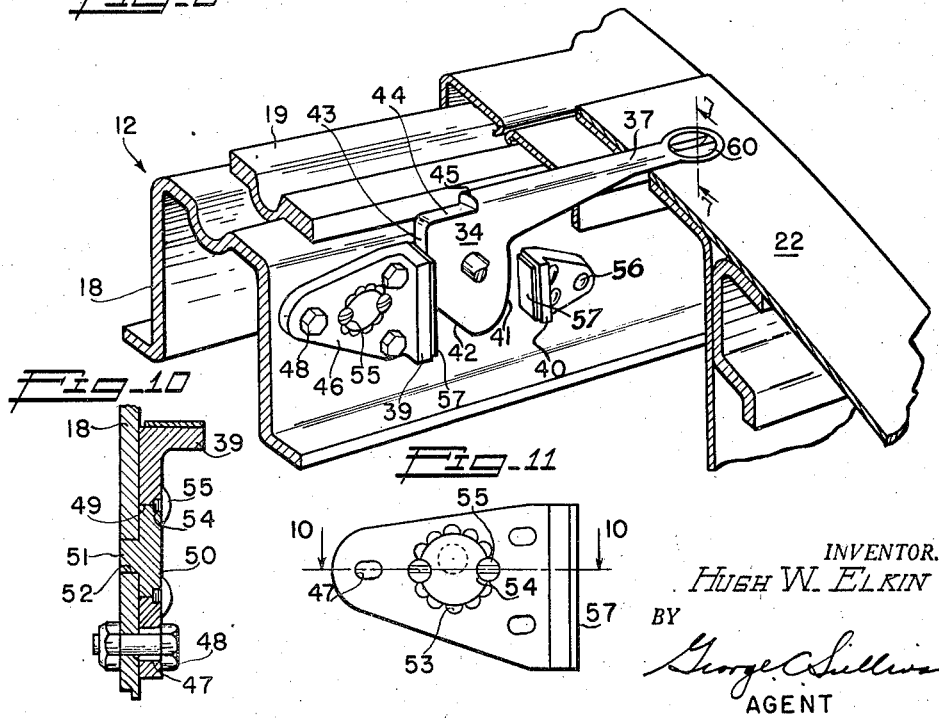
Fig. 9
Fig. 10
Fig. 11
INVENTOR.
HUGH W. ELKIN
BY
George C. Sullivan
AGENT Patented June 3, 1947

2,421,689

UNITED STATES PATENT OFFICE 2,421,689

COWLING ARRANGEMENT

Hugh W. Elkin, Pasadena, Calif., assignor to Lockheed Aircraft Corporation, Burbank, Calif.

Application October 9, 1944, Serial No. 557,752

8 Claims. (Cl. 244—130)

This invention relates to engine cowlings and has particular reference to cowl assemblies for air craft engines. It is a general object of the invention to provide a practical, effective engine cowl structure of this character that facilitates accessibility to the engine.

It has been the general practice to construct the cowls for aircraft engines in two or more removable panels or sections and to attach the panels to the supporting structures by means of multiplicities of fastening devices. In order to inspect and service the engine it is necessary to frequently remove the panels, and for this reason, the fastening devices employed have been of the types that are readily releasable. Although the fasteners are usually of a quick release type, the operations necessary to release and then reconnect the multitude of fasteners each time a panel is removed and replaced are very tedious and time consuming. The large number of fasteners is also undesirable from an aero-dynamic standpoint, producing substantial drag. Furthermore, the quick release fasteners heretofore employed on engine cowls have been relatively small and subject to breakage and distortion as a result of the repeated removal and reattachment of the panels, accompanying the essential servicing of the engine.

An important object of the invention is to provide a cowl assembly for aircraft engines, and the like, characterized by the ease and rapidity with which the cowl panels may be installed and removed. The invention provides a plurality of cowl panels which may each be securely installed in position by simple operation of a pair of levers. The arrangement completely avoids the necessity for a multiplicity of individual fastening devices and a few simple manual operations are all that is required to independently secure the panels in the operative positions or to release the panels for free removal. A simple screw driver or similar tool serves to lock and release the securing means of the invention.

Another object of the invention is to provide an engine cowling assembly in which the cowl panels are completely removable as individual elements, thus permitting free access to the whole or part of the engine. Upon the release of the securing means, the panels are entirely detached and may be removed from the airplane to give full access to the engine.

Another object of the invention is to provide a cowl assembly for aircraft engines presenting an external surface having a minimum of interruptions and irregularities, thereby reducing drag. The securing or attaching means of the cowl sections embody relatively small levers which may lie flush with the cowl surfaces, and with the exception of these levers, no other breaks, interruptions or irregularities are present in the surface.

It is another object of the invention to provide a cowling structure characterized by dependable cam means which assure the retention of the cowl sections in firm contact with the supporting structure and which are adjustable to obtain the most efficient securing action. The cowl sections are formed with grooves or channels for receiving ring elements of the supporting framework and the cam means operates to initially bring the channels into full pressure engagement with the ring elements and then releasably locks the panels in the positions where this engagement is maintained to prevent panel vibration.

A further object of the invention is to provide a combined supporting structure and cowl panel assembly in which all fore and aft cowl loads are transmitted through the above referred to cam means to fore and aft beams, which in turn, transmit the loads to the airplane structure proper while all bursting air loads imposed on the cowl panels are transmitted directly from the panels to supporting rings of the framework, which rings carry such loads under tension. The construction is such that all fore and aft cowl loads are transmitted or applied directly to the framework of the nacelle without affecting the supporting rings and is such that the rings act under tension to independently assume all radial cowl loads.

A further object of the invention is to provide a cowl structure in which the cam action maintains substantially airtight contact between the cowl panels and the fixed airplane structure so that the ducts in the panel sections are kept in substantially leak-proof communication with the ducts of the airplane.

A still further object of the invention is to provide an aircraft engine cowl assembly that is inexpensive, light in weight, and that does not necessitate the employment of hinges, latches, or the like.

Other objects and features of the invention will be readily understood from the following detailed description of a typical preferred form of the invention wherein reference will be made to the accompanying drawings in which:

Figure 4 is a view similar to Figure 2 showing the cam lever in the released position and illustrating the panel in position for attachment to the framework;

Figure 5 is a perspective view of the cowl panel supporting framework with the panels removed and illustrating a portion of the nacelle frame;

Figure 6 is a perspective view of one of the cowl panels as detached from the assembly;

Figure 7 is an enlarged fragmentary sectional view taken substantially as indicated by line 7—7 on Figure 9;

Figure 8 is an enlarged fragmentary detailed sectional view taken substantially as indicated by line 8—8 on Figure 1;

Figure 9 is an enlarged fragmentary perspective view illustrating one of the cams in association with its cam stops;

Figure 10 is an enlarged horizontal detailed sectional view of a cam stop and its adjustment stud, taken substantially as indicated by line 10—10 on Figure 11; and Figure 11 is a front elevation of the cam stop and its adjustment means.

Figure 1:
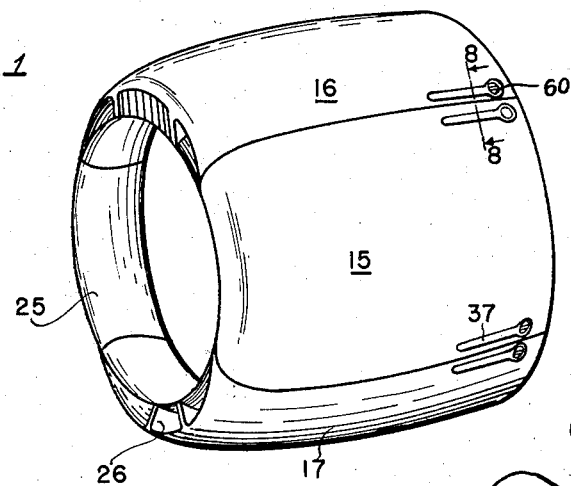
Figure 1 is a perspective view of the assembled cowl panels.

The cowling arrangement of the invention may be employed on aircraft of different characters and in association with various types of aircraft power plants, being capable of considerable variation to adapt it for given applications. In the drawings I have illustrated the invention embodied in a form suitable for use with a radial air-cooled engine, and I will proceed with a detailed description of the illustrated structure, it being understood that this is only one preferred embodiment and application.

Referring first to Figure 5, it will be seen that the supporting structure or framework of the cowling assembly comprises a forward ring 10, an aft ring 11 and a plurality of circumferentially spaced fore and aft beams 12. The rings 10 and 11 may be of channel stock constructed to have the channels at their aft sides. The aft ring 11 is somewhat larger in diameter than the forward ring 10 and is interrupted at circumferentially spaced points by blocks 13. The blocks 13 may be castings of selected metal or alloy, and the sections of the ring 11 are rigidly fixed to them so that the assembly forms a continuous ring-like unit. The fore and aft beam members 14 of the nacelle, not shown, are secured to the blocks 13 by suitable terminal connections. It will be observed that the aft ring 11 is made up of a plurality of sections secured between terminal blocks 13 on the forward end of the nacelle framework.

The fore and aft beams 12 of the cowling framework occur at the lines of division or joinder of the cowl panels and the number and disposition of the beams are governed by the number and location of the panels. In the particular construction illustrated, there are four panels, namely, two side panels 15, a top panel 16 and a bottom panel 17. The panels are of substantially equal circumferential extent, and there are four substantially equally spaced fore and aft beams 12. The forward ends of the beams 12 are suitably riveted, bolted, or otherwise fixed to the forward ring 10 and the rear ends of the beams are secured to the terminal blocks 13 by terminal connections. The beams 12 may be of any selected or required cross sectional configuration. As best illustrated in Figures 8 and 9, the beams 12 are box-like elements having spaced side walls 18 that are generally radial with respect to the central longitudinal axis of the assembly. The outer walls of the beams 12 are channeled or grooved to carry chafing pads 19; see Figures 8 and 9. These pads 19 are omitted from Figure 5 to clarify the showing. The upper and lower sections of the aft ring 11 are provided with air duct ports 20, and may carry similar chafing and sealing pads. Circumferentially spaced locating pins 21 project from the forward face of the aft ring 11 to assist in locating the cowl panels as will be later described.

The cowl sections or panels 15, 16 and 17 are independently separable elements normally assembled on the above described supporting framework to constitute a tubular cowling for the engine. The configuration of the panels will vary in different applications of the invention. In the case illustrated, the panels 15, 16 and 17 are substantially alike in shape and are elongate elements each having a transverse or circumferential curvature of about 90°. The construction of the panels is subject to considerable variation. For the purpose of the present disclosure, it will be assumed that each panel 15, 16 and 17 is comprised of an outer skin 22, a suitable internal stiffening and strengthening structure and an internal skin 24. The invention is not primarily concerned with the details of the internal panel elements, and these parts have been omitted from the drawings to clarify the showing. However, I have shown fore and aft stiffening and reinforcing elements 23 of the internal panel assemblies extending along the longitudinal edges of the panels. These elements 23 are stepped back from the edges of the panels and lie in spaced relation to the beams 12, when the panels are in position on the supporting structure. The inner skins 24 of the panels may cover the fore and aft stiffening elements 23. The forward ends of the panels 15, 16 and 17 have contoured inner aprons 25 defining the throat or mouth of the cowl assembly. The upper and lower cowl panels 16 and 17 are provided with fore and aft ducts 26 leading from the forward end of the assembly to the duct ports 20 of the aft supporting ring 11. The longitudinal edges of the panels are preferably straight and related to come into abutment or parallel adjacent relation directly over the beams 12 as best shown in Figure 8.

In accordance with the invention, the panels 15, 16 and 17 are constructed to cooperate with the fore and aft rings 10 and 11 for the transmission of radial loads. The rear edge portions of each panel has a rearwardly facing groove or channel 27 for receiving the aft ring 11; see Figures 2, 4 and 6. The forward portions of the panels 15, 16 and 17, adjacent the inner edges of the aprons 25, have similar channels 28 for receiving or cooperating with the forward supporting ring 10. The channels 27 and 28 are circumferentially curved and are proportioned to accurately conform to the rings 10 and 11. The channels 27 and 28 may be constructed to have continuous engagement with the supporting rings throughout the transverse or circumferential extent of their respective panels 15, 16 and 17. It is desirable to have the two channels 27 and 28 of a panel spaced and related so as to both have full cooperation with their respective supporting rings 11 and 10. It will be apparent that upon correctly orienting a panel with respect to the supporting structure a simple rearward motion of the panel brings its grooves into simultaneous cooperation with the fore and aft rings 10 and 11. The aft ends of the panels 15, 16 and 17 have sockets or openings 29 for receiving the above described locator pins 21. The cooperation of the pins 21 and openings 29 definitely locates the panels in their correct circumferential positions.

With the assembly thus far described, it will be seen that the panels 15, 16 and 17 are dependably supported against radial loading in both directions. The invention provides dependable, easily operated means for effectively supporting the panels against axial or fore and aft loading, and for moving the panels axially between the positions where they are hooked or engaged on the supporting rings 10 and 11 and the positions where they are free of the rings. These means are in the form of cam mechanisms and are characterized by the simplicity of their construction and the ease of their operation. A cam means is provided adjacent each longitudinal edge of each panel 15, 16 and 17 to cooperate with stops or abutments on the beams 12 of the supporting structure. I will proceed with a description of a single cam means of the panels 15, it being understood that this description is equally applicable to the other cam devices. Corresponding reference numerals are applied to corresponding parts of the several cam devices.

Each cam mechanism includes a bracket 30 applied to a fore and aft stiffening element 23 of the panel 15; see Figure 8. The bracket 30 is spaced some distance from the aft end of the panel. An opening 31 in the bracket 30 carries a bolt or shaft 32 which continues inwardly through an opening 33 in the inner skin 24 and stiffening element 23. The head of the bolt 32 is spaced beyond the exposed face of the bracket 30. The cam mechanism further includes a cam lever 34 pivotally supported by the bolt or shaft 32. The shaft 32 passes through an opening 35 in the lever 34 and bushings or spacers 36 are provided in the opening. The lever 34 is supported on the shaft 32 between the bracket 30 and the head of the bolt-like shaft. The principal arm 37 of the lever 34 is in the nature of a handle designed to facilitate lever operation. An elongate opening 38 is formed in the outer skin 22 of the panel to receive the lever and to allow outward rotation of its arm 37. The opening 38 is shaped and proportioned to accurately receive the lever and the outer surface of the lever arm 37 may be shaped to conform to and lie flush with the surface of the skin 22 when the lever is in its down or actuated position. The outer skins 22 of the panels may be smooth and unbroken except for the openings 38 and the levers 34, which normally completely occupy the openings and lie flush with the skin surfaces to reduce drag to a minimum.

The lever 34 is provided with cam faces for cooperating with spaced cam stops or abutments 39 and 40 on the adjacent beam 12 of the supporting framework. As seen in Figure 9, the lever 34 has a rearwardly facing cam surface 41 for cooperating with the abutment 40. The surface 41 is curved adjacent its lower end and merges into an upwardly and forwardly inclined cam face 42. The face 42 may be straight and flat, and extends upwardly and forwardly to join a third surface 43 which is substantially vertical or normal to the longitudinal axis of the beam 12 when the lever 43 is in its operative position. The exposed longitudinal edge of the lever 34 is cut back at 44 to leave an abrupt shoulder 45. The shoulder 45 is engageable with the outer panel skin 22 when the lever 34 is swung to its raised position and the shoulder forms a stop to limit the forward swinging of the lever.

The two abutments 39 and 40 are rigid with the beam 12 and are arranged to be engaged by the cam surfaces of the lever 34 upon pivoting of the lever between its raised and lowered positions. The forward stop or abutment 39 is engageable by the surfaces 42 and 43 of the cam lever to effect rearward movement of the panel and thus bring its channels 27 and 28 into effective cooperation with the supporting rings 11 and 10. The abutment 39 is in the nature of a projecting lip or flange on a bracket-like base 46 which engages the wall 18 of the beam 12. In accordance with the invention the cam mechanism embodies an adjustment means. In the case illustrated the stop or abutment 39 is adjustable axially of the beam 12 to assure correct operation of the cam mechanism and to bring about firm engagement of the channels 27 and 28 with the supporting rings 10 and 11. Spaced openings 47 are provided in the base 46 of the abutment to receive attaching bolts 48. The openings 47 are elongated longitudinally of the beam 12 to allow axial adjustment of the abutment relative to the bolts 48. A substantially central opening 49 is provided in the abutment base 46. The opening 49 receives a rotatable disc-like adjusting stud 50. An eccentric trunnion or pin 51 projects from the inner side of the stud 50 and is rotatably received in an opening 52 in the wall 18 of the beam 12. It will be seen that upon rotation of the stud 50, the stop 39 is adjusted fore or aft, depending upon the direction of such rotation. Means is provided for setting or securing the stud 50 in the adjusted position. A series of equally spaced notches 53 is provided in the wall of the opening 49 and the exposed end of the stud 50 has two diametrically opposite notches 54. The stud 50, when turned to adjust the abutment 39, is moved to any one of a number of rotative positions where its notches 54 register with a pair of diametrically opposite notches 53. Pins or screws 55 are then installed in the registering notches 53 and 54 to secure the stud 50 in the adjusted position. Following adjustment of the abutment 39 by the stud 50, the bolts 48 are tightened down to secure the abutment in the final position. With the adjustment means just described, the cam abutment 39 may be accurately set to obtain the most efficient cam action and dependable vibration resisting connection of the panel to its supporting structure.

The cam surface 43 of the lever 34 flatly cooperates with the face of the abutment 39 when the lever is in its fully actuated position. This is shown in Figure 9 of the drawings. In practice it is preferred to have the cam lever 34 throw slightly past center to bring its surface 43 into flat engagement with the abutment. The extensive engagement of the surface 43 with the abutment 39 and the over center position of the lever 34 resist retrograde rotation of the lever, and the lever is automatically held against displacement from its fully actuated position. Furthermore, the extensive cooperation of the surface 43 with the abutment 39 provides for the dependable transmission of forward axial loads from the cowl panel to the beam 12 of the supporting structure.

The stop or abutment 40 is spaced aft of the abutment 39 and is rigidly fixed to the beam 12 by rivets 56, bolts or the like. The abutment 40 presents an active face which is in substantially parallel relation to the abutment 39. The active face of the abutment 40 is engaged by the cam face 41 to cause forward movement of the panel 15 for the purpose of releasing the channels 27 and 28 from the supporting rings 11 and 10. The flanges or active faces of the abutments 39 and 40 may be faced with pads 57 of wear-resistant material.

Figure 2:
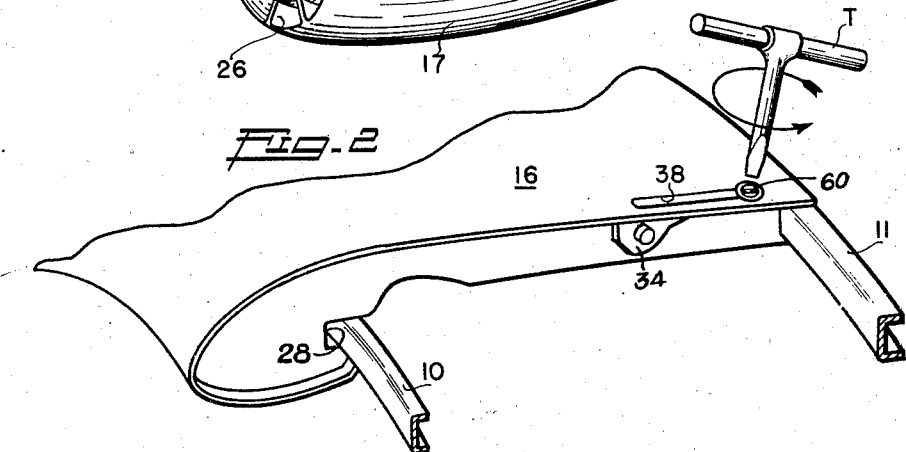
Figure 2 is an enlarged fragmentary perspective view showing the manner in which a cowl panel cooperates with the rings of the supporting framework.

The invention may include means for positively locking the cam levers 34 in the actuated positions with their faces 43 in cooperation with the abutment 39 so as to lock the panels 15, 16, and 17 in place. Any appropriate means may be employed to lock the cam levers 34 in their down or actuated positions. In the drawings I have shown Dzus type studs 60 rotatably engaged in openings in the outer ends of the cam levers; see Figure 7. The studs 60 have bayonet slots 61 for receiving and cooperating with springs 62 secured to the beams 12. The springs 62 are arranged within the beams 12 and the studs 60 are adapted to pass through openings 63 in the walls of the beams to cooperate with the springs. When a lever 34 is rotated to the lowered or actuated position its stud 60 is rotated to bring the bayonet slots 61 into receiving relation to the spring 62 and is then rotated to move the bayonet slots into locking cooperation with the spring. A simple partial rotation of the stud 60 frees it from the spring 62, releasing the cam lever 34 for outward swinging. A simple tool T as illustrated in Figure 2 may be utilized to rotate the studs 60, and if required, may be employed in prying the levers 34 outwardly for ready manual engagement.

Figure 3:
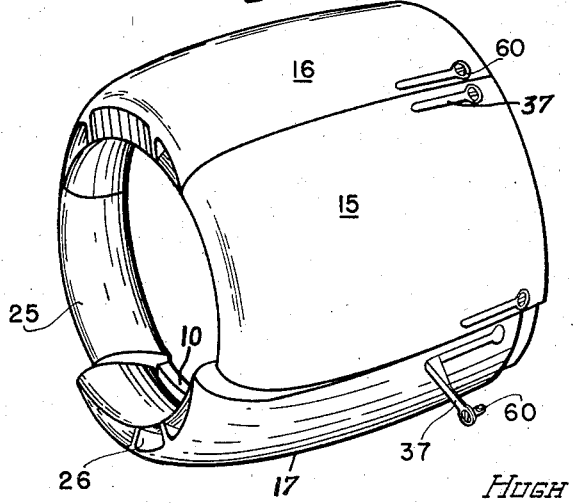
Figure 3 is a view similar to Figure 1 showing one panel in position for attachment to the supporting framework.

It is believed that the operation and features of the cowling arrangement will be apparent from the foregoing description. In applying a panel it is first necessary to bring the two levers 43 to the projecting position illustrated in Figures 4 and 6. With the levers in this position the panel is brought to a position such as shown in the lower portion of Figure 3 where its openings 29 are aligned with the locator pins 21 and the cam portions of the levers 34 are then swung aft so that the cam surfaces 42 and 43 cooperate with the abutment 39 to force the panel aft. The cam action moves the panel rearwardly to bring its channels 27 and 28 into tight engagement with the rings 11 and 10. When the levers 34 have been moved to their final flush positions in the openings 38 and the studs 60 are given a partial rotation, so that their bayonet slots 61 interlock with the springs 62, the levers are positively locked in place. These operations are repeated in installing the several panels 15, 16 and 17.

It should be noted that the panels may be quickly installed and that there is no necessity for separately manipulating a multiplicity of individual fastening devices. With the panels installed, all forward cowl loads are transmitted from the panels 15, 16 and 17 to the beams 12 through the medium of the cam surfaces 43 and the abutments 39. This axial loading is transmitted from the beams 12 directly to the beam elements 14 of the nacelle, or air-frame. All radial loading on the cowl panels is transferred to the rings 11 and 10 by the channels 27 and 28, and this loading is distributed throughout the spaced rings. The rings 10 and 11 act under tension in assuming the radial bursting air loads imposed on the cowl panels and the loading of the rings is independent of the loading of the beams 12.

When it is desired to inspect or service the engine, the cowl panels may be removed individually and as many panels may be detached as is found necessary for the particular operation. In order to remove a cowl panel it is only necessary to partially rotate its studs 60 to release the slots 61 from the springs 62, whereupon the levers 34 are rotated forwardly. This forward rotation of the levers results in cooperation between the cam surfaces 41 and the aft abutment 40. The resultant cam action forces the cowl panel forwardly, releasing its channels 27 and 28 from the supporting rings 11 and 10. With the channels released from the supporting rings, the panel is completely freed from the supporting structure.

Having described only a typical form of the invention, I do not wish to be limited to the specific details herein set forth, but wish to reserve to myself any variations or modifications that may appear to those skilled in the art or fall within the scope of the following claims.

I claim:

1. An aircraft cowling assembly comprising a supporting structure including an axially extending beam and a circumferentially extending member, a removable cowl panel having a channel for receiving said member for the transmission of radial loads between the panel and said structure, and means on the panel and said structure for shifting the panel axially to move the channel into and out of engagement with said member, said means including abutments on the beam and a rotatable cam on the panel for cooperating with the abutments.

2. An aircraft cowling assembly comprising a supporting structure including spaced axial beams and axially spaced circumferentially extending members, a cowl panel for arrangement on said structure and having axially spaced circumferentially extending grooves adapted to receive said members for the transmission of radial loads from the panel to said structure, and cam elements on the panel and spaced beams for shifting the panel axially to move the channels into and out of engagement with said members and operable to transmit axial loads from the panel to said structure when the channels and said members are in cooperation.

3. An aircraft cowling assembly comprising a supporting structure including spaced axial beams and axially spaced circumferentially extending members, a cowl panel adapted to be removably engaged on the supporting structure, the panel having rearwardly facing channels adjacent its fore and aft ends adapted to receive said members for the transmission of radial loads between the panel and said structure, and releasable means for holding the panel in the position where its channels cooperate with said members and operable to transmit axial loads between the panel and said structure.

4. An aircraft cowling assembly comprising a supporting structure including spaced axially extending beams, and axially spaced circumferentially extending members connected with the beams, a plurality of cowl panels adapted to be removably supported on said structure, each panel having axially spaced channels for receiving said members for the transference of radial loads between the panels and said structure, and means for shifting the individual panels axially to bring their channels into receiving engagement with said members and thereafter transfer axial loads between the panels and said structure.

5. An aircraft cowling assembly comprising a supporting structure including spaced axially extending beams, and axially spaced circumferentially extending members connected with the beams, a plurality of cowl panels adapted to be removably supported on said structure, each panel having axially spaced channels for receiving said members for the transference of radial loads between the panels and said structure, and means for shifting the individual panels axially to bring their channels into receiving engagement with said members and thereafter transfer axial loads between the panels and said structure for the transference of radial loads between the panels and said structure, said means including cooperable cam elements on the panels and said beams.

6. A cowl assembly comprising a supporting structure, a cowl panel for arrangement on said structure, parts on said structure and panel at the fore and aft ends of the panel adapted to have interfitting engagement for the transference of loads between the panel and structure in one direction, and means for shifting the panel axially to bring said parts into interfitting engagement and for thereafter transferring loads between the panel and structure in the other direction including spaced abutments on said structure, and a cam on the panel for cooperating with the abutments.

7. A cowl assembly comprising a supporting structure, a cowl panel for arrangement on said structure, parts on said structure and panel adapted to have interfitting engagement for the transference of loads between the panel and structure in one direction, and means operable to shift the panel axially with respect to said structure to bring said parts into cooperation and for thereafter transferring loads between the panel and structure in the other direction, said means including spaced abutments on said structure, a cam on the panel for cooperating with the abutments, and means for adjusting at least one of the abutments.

8. An aircraft cowling assembly comprising a supporting structure including spaced axially extending beams, and axially spaced circumferentially extending members connected with the beams, a plurality of cowl panels adapted to be removably supported on said structure, each panel having axially spaced channels for receiving said members for the transference of radial loads between the panels and said structure, and means for shifting the individual panels axially to bring their channels into receiving engagement with said members and thereafter transfer axial loads between the panels and said structure, said means including pairs of spaced abutments on the beams, a lever rotatably supported on each panel adjacent each axial edge of the same, and cam parts on the levers for cooperating with said abutments.

HUGH W. ELKIN.

REFERENCES CITED

The following references are of record in the file of this patent:

UNITED STATES PATENTS

| Number | Name | Date |
| --- | --- | --- |
| 1,896,222 | Chilton | Feb. 7, 1933 |
| 2,047,948 | Breene et al. | July 21, 1936 |
| 2,362,381 | Lawry | Nov. 7, 1944 |

OTHER REFERENCES

Publication, "Quick Release Fasteners on German Aircraft," 244–129, by D. B. Cobb, published by Royal Aircraft Establishment, South Farnborough, Hants.